United States Patent Office 3,577,249
Patented May 4, 1971

3,577,249
BITUMINOUS DISPERSIONS HAVING IMPROVED ADHESION AND PROCESS THEREOF
Jack N. Dybalski, Chicago, Ill., assignor to Armour Industrial Chemical Company, Chicago, Ill.
No Drawing. Filed Feb. 10, 1969, Ser. No. 798,135
Int. Cl. C08h 13/00; C08k 1/62; C09d 3/24
U.S. Cl. 106—269
9 Claims

ABSTRACT OF THE DISCLOSURE

Bituminous dispersion containing a bituminous phase in an amount from 20–90 wt. percent can be provided with unusually good adhesion by the addition of certain aryl-substituted aliphatic nitrogen compounds. These compounds are long chain mono-aralkyl or di-aralkyl amines, aralkyl diamines, and their oil-soluble salts.

---

This invention relates to improvements in bituminous dispersions, generally known under the name of cationic bituminous emulsions, of both the oil-in-water and water-in-oil types. More particularly, it relates to improved bituminous dispersions characterized by an unusually good adhesion to siliceous and calcareous aggregate surfaces.

The dispersions have utility in a variety of protective coating operations such as a permanent protective coating for structures exposed to the atmosphere or sunk into the earth; as an impermeable binder to stabilize porous earth or irrigation ditches, dams, or levies; drilling fluids for oil-well operations and the like; as the mtin material for paving and maintaining roads and highways, and in other similar applications where their particular properties can be utilized.

Bituminous dispersions or emulsions are generally prepared by dispersing molten bitumen, such as asphalt, in or with water in the presence of an emulsifying agent, to form a cationic, anionic or nonionic dispersion depending upon the nature of the emulsifying agent. The cationic and anionic emulsion dispersions are much more common than then nonionic dispersions. Generally such dispersions must meet five important criteria, namely stability, demulsibility, bitumen content, viscosity, and the ability to adhere to aggregate under operating conditions. The last requirement is particularly important and significant as bitumen dispersions, especially asphalt emulsions, are notoriously poor in adhesion properties and even the best of them generally have only a limited range of utilities. I have now discovered that certain amines and diamines effect substantial improvement in the adhesion of bitumen binder to aggregate surface in bitumen dispersions.

In one embodiment, an exemplary cationic bitumen dispersion of the invention is of the type containing a bituminous phase in an amount from 20–90 weight percent emulsified by a water-soluble cationic emulsifier, and wherein the improvement comprises from about 0.05–5.0 wt. percent of an aryl-substituted aliphatic nitrogen compound selected from the group consisting of:
 (a) Mono-aralkyl amines represented by the formula:

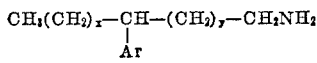

wherein $x$ and $y$ each is an integer from 0–19, the sum of $x$ and $y$ is an integer from 5–19 and Ar is an aryl group selected from phenyl, tolyl and xylyl;
 (b) Di-aralkyl amines represented by the formula:

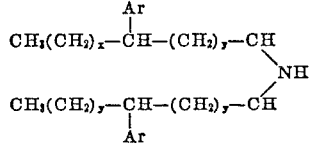

wherein $x$, $y$ and Ar are as defined above;
 (c) Aralkyl diamines represented by the formula:

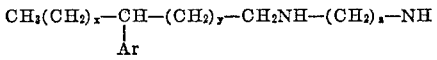

wherein $x$, $y$ and Ar are as defined above and $z$ is an integer from 2–5; and
 (d) The oil-soluble, long chain organic acid salts of the foregoing.

By the term "bituminous" is meant any naturally occurring or petroleum derived bitumen substance including asphalt, asphaltites, asphaltic pyrobitumens and mineral waxes. Any such bituminous material may be employed to prepare the dispersions of this invention, for instance, natural and petroleum asphalts, air-blown petroleum asphalts, gilsonite, coal tar, oil-gas tar, pitch, etc. Dispersions thereof can either be of the so-called oil-in-water type in which the dispersed phase is aqueous or of the water-in-oil type in which the dispersed phase is bituminous. The particles of bitumen in the dispersion may range from about 1 to about 20 microns in size. Such dispersions can be with or without a solvent, such as diesel fuel and toluene, and include cut-back systems.

Useful nitrogen containing adhesion agents of the invention are described in the following copending applications: Ser. No. 685,260 filed Nov. 24, 1967 relating to the aryl-substituted aliphatic diamine compounds; and Ser. No. 585,751 filed Oct. 11, 1966 relating to the aryl-substituted aliphatic secondary amine compounds.

In one specific embodiment of preferred adhesion agents, the aryl-substituted aliphatic, or aralkyl, group will have phenyl as the aryl portion and each alkyl portion will contain a total of about 18 carbons. The aryl group will be attached to an internal carbon atom of the long chain alkyl group substituted on a nitrogen atom as set forth in the hereinabove formula. Specific examples thereof include phenylstearyl amine, diphenylstearyl amine and N-phenylstearyl-N,N'-trimethylene diamine. The oil-soluble salts thereof are also preferred and include the respective aralkyl amine oil-soluble salts of tallow fatty acids, tall oil fatty acids, soya fatty acids, fish oil fatty acids, naphthenic acids and high molecular weight sulfonic acids, and specifically preferred are oleic acid, tall oil acids, naphthenic acid and dodecyl benzene sulfonic acid. In other suitable compounds the alkyl portions will contain 11, 16 or 22 carbon atoms and the aryl portion will be phenyl, tolyl or xylyl. The compounds may be obtained commercially or prepared by methods such as set forth in the hereinabove copending applications. For example, a suitable unsaturated fatty acid such as oleic acid may be arylated to i.e., phenylstearic acid, which can be converted to the corresponding nitrile and the nitrile converted to the desired primary or secondary amine or the primary amine can be converted to the desired diamine.

The operative amounts of the aryl-substituted aliphatic nitrogen compound may vary from as little as 0.05 to about 5.0% by weight of the entire dispersion; and about 1–3% is especially preferred. Greater amounts and slightly lesser amounts may be employed but without substantial further advantages. The actual amount employed to achieve the optimum adhesion in a particular instance will vary somewhat, depending on the particular dispersion and aryl-substituted aliphatic nitrogen compound.

The oil-in-water bituminous dispersions of the invention are prepared by dispersing molten bitumen in water, in the presence of a water-soluble cationic emulsifying agent. The water-in-oil type, sometimes called invert emulsions, will have generally about 10–15% by weight of water dispersed in the molten bitumen and generally will not contain any cationic water-soluble emulsifier. When a cationic emulsifier is used in the foregoing, generally the amount will be 0.2–5% by weight of the total dispersion, and 0.2–1% is generally preferred. Fur purposes of making a drilling fluid, where vast surface areas must be covered, it is preferred to use 0.5–5% although the range is generally broader i.e. 0.5–10%.

The particular cationic emulsifying agent is not critical to this invention, and numerous cationic emulsifiers may be employed for the preparation of the dispersions of the invention. Quaternary ammonium salts are preferred, and they have the general formula:

$$R_1R_2R_3R_4N \cdot X$$

in which $R_1$, $R_2$, $R_3$ and $R_4$ are organic radicals having a carbon-nitrogen linkage to the nitrogen atom, preferably alkyl, alkenyl, hydroxyalkyl, aralkyl, and alkylaryl radicals containing from 1 to 24 carbon, or heterocyclic radicals containing from 4 to 10 carbons in which from 2 to 3 of the nitrogen valencies are shared by two carbon atoms in the heterocyclic radical, and X is an anion whose valence does not exceed 2, such as halides such as chloride, bromide and methofluoride, acetate, phosphate, nitrate, methyl sulfate and other water-soluble radicals. Also included, and particularly preferred, are di-quaternaries such as the phenylstearyl di-quaternary: N-9(10) phenylstearyl-N,N,N',N',N'-pentamethyl trimethylene di-ammonium chloride.

It must be noted that the aryl-substituted aliphatic amines and diamines and their oil-soluble salts of the invention form no part of the water-soluble emulsifier in those bituminous dispersions of the invention having water-soluble emulsifiers. The water-soluble emulsifying agent causes the bitumen to deposit upon the surface of the aggregate. I have found that the above-described oil-soluble fatty acid salts of arylated aliphatic amines and diamines cause the bitumen to adhere to the surface of the aggregate once it has migrated there. The adhesion agent causes the bitumen to adhere more tenaciously than the water-soluble cationic emulsifier could.

EXAMPLE I

Di-(phenylstearyl) amine was prepared as follows: A commercial grade oleic acid which contained a few percent of palmitioleic acid was converted into phenylstearic acid by a Friedel-Crafts reaction using aluminum chloride as the catalyst and benzene as the arylating agent. Thereafter, phenylstearonitrile was prepared on a continuous nitrile unit over bauxite catalyst at 280–300° C. from 1127 g. (grams) phenylstearic acid. A crude yield of 833.5 g. of phenylstearonitrile was obtained (comprising a mixture of isomers, predominantly the $C_8$ to $C_{14}$ and the $C_{17}$ isomers, with lesser proportions of other isomers). A one-liter Magne-Dash autoclave was charged with 552.3 g. (1.62 moles) phenylstearonitrile and 19.6 g. (3% by wt.) copper chromate catalyst. The reactor was flushed with hydrogen and the temperature raised to 195° C. with hydrogen pressure being maintained at 200 p.s.i.g. with continuous bleeding at 195–200° C. After 28 hours of reaction, the mixture was cooled and filtered to yield 525.1 g. (96.2% mass yield) of viscous, amber oil which analyzed at 93.7% di(phenyloctadecyl) amine.

EXAMPLE II

Phenylstearonitrile (591 g.), prepared as described in Example I was reduced in a one-liter Parr autoclave over 2% alcohol washed Raney nickel catalyst in the presence of ammonia (150 p.s.i./30–40° C.) and hydrogen (800 p.s.i. total pressure at 125° C. for 4–5 hours), to obtain phenyloctadecylamine in 67% yield upon distillation at 183–190°/0.3 mm. as a mixture of isomers.

Acrylonitrile (61.0 g., 1.15 moles) was added slowly over 2 hours, with stirring, to a mixture of the phenyloctadecylamine (363.8 g., 1.05 moles) and 17.0 g. water at 60–70° C. The resulting mixture was then stirred at 70–80° C. for 4 additional hours, the water was separated and the product dried under reduced pressure at 60–70° C. to result in about 99% yield of N-(beta-cyanoethyl)phenyloctadecylamine. This was reduced in the presence of 1% alcohol washed Raney nickel, ammonia (125 p.s.i./40° C.) and hydrogen (800 p.s.i. total pressure) at 135° C. in 6–7 hours to obtain phenyloctadecyltrimethylene diamine. The product was a mixture of isomers, predominantly the $C_8$ to $C_{14}$ and the $C_{17}$ isomesr.

EXAMPLE III

Phenyloctadecyltrimethylene diamine (50 g., 0.124 mole), prepared as described in Example II, was quaternized in isopropanol and sodium bicarbonate (35.3 g., 0.372 mole) with methyl chloride at 80–90/65–70 p.s.i. for 4–5 hours with periodic venting. The sodium bicarbonate was removed by filtration and the solvent stripped under reduced pressure to yield 60 g. of a viscous oil which analyzed as 88.1% diquarternary and 2.1% free amine. The product N,N,N',N',N' - pentamethyl - N-phenyloctadecyltrimethylene diammonium chloride, was a mixture of isomers, predominantly the $C_8$–$C_{14}$ and the $C_{17}$ isomers.

EXAMPLE IV

Exemplary oil-in-water type dispersions were formulated and evaluated. The basic formulation was an asphalt based drilling fluid having the following composition by weight:

30% asphalt (85–100 penetration)
30% Diesel fuel
2–3% (in water) of either: N,N,N-trimethyl-N-phenylstearyl ammonium chloride or N,N,N,N',N'-pentamethyl - N,N' - trimethylene - N' - phenylstearyl di-ammonium dichloride
40% water To this was added (into the asphalt) 2% by weight of the total dispersion of the chemical noted in Table I.

Adhesion and resistance to removal by water of the formulations were evaluated by two tests: In test #1 (for resistance to water removal) 100 grams of 35 mesh Ottawa Sand were wetted with 5 grams of water, and 10 grams of the formulation being tested were added. The mixture was agitated and then allowed to stand at room temperature for 30 minutes. The coated mass was then immersed in 300 grams of water and, after immersion for one hour, an estimation of the percent coating that remained on the sand was recorded. Results are shown in Table I.

In test #2 (for adhesion ability) 100 grams of 35 mesh Ottawa sand was weighed into 300 ml. of water. To the water was added 20 grams of the formulation being tested. The entire mass was agitated for 3 minutes, allowed to settle and remain static for 30 minutes, and then an estimate of the percent coating obtained upon the sand was recorded. Results are shown in Table I.

TABLE I

| Run No. | Adhesion agent added | Percent Test #1 | Test #2 |
|---|---|---|---|
| 1 | Control (basic formulation) | 50 | 30 |
| 2 | Phenylstearylamine (using the quaternary emulsifier) | 90 | 80 |
| 3 | Phenylstearylamine at 1% conc. (using the diquaternary emulsifier) | 85 | 75 |
| 4 | Phenylstearyl trimethylene diamine at 1% conc. | 94 | 90 |
| 5 | Diphenylstearylamine | 90 | 80 |
| 6 | Phenylstearic acid salt of phenylstearylamine (50/50 proportions of acid/amine) | 95 | 92 |
| 7 | Phenylstearic acid salt of phenylstearylamine (32/68 proportions) | 92 | 90 |
| 8 | Phenylstearic acid salt of N-phenylstearyl trimethylene diamine (64/36 proportions) | 99 | 97 |
| 9 | Oleic acid salt of N-phenylstearyl trimethylene diamine (60/40 proportions) | 99 | 97 |
| 10 | Tall oil-fatty acid salt of N-phenylstearyl trimethylene diamine (61/39 proportions) | 99 | 95 |
| 11 | Dodecyl benzene sulfonic acid salt of N-phenylstearyl trimethylene diamine (50/50 proportions) | 85 | 80 |
| 12 | 1% conc. of oleic acid salt of tolylstearylamine (50/50 proportions) | 90 | 85 |
| 13 | 1% conc. of oleic acid salt of xylylstearylamine (50/50 proportions) | 90 | 85 |

EXAMPLE V

Completion fluid formulations for use in water injection petroleum operations were evaluated by test #1 and test #2 as set forth in Example IV. The basic oil and solvent based completion fluid had the following composition:

|  | Percent |
|---|---|
| Diesel fuel | 28 |
| Toluene | 27 |
| Tap water | 45 |
| N,N,N,N',N' - pentamethyl - N,N' - trimethylene-N' - phenylstearyl diammonium dichloride (in the water phase) | 3 |

To the above formulation was added in the solvent blend, 2% of the chemicals set forth in Table II. Exemplary results are shown in Table II.

TABLE II

| Run No. | Adhesion agent added | Percent Test #1 | Test #2 |
|---|---|---|---|
| 1 | Control (basic formulation) | 25 | 10 |
| 2 | Phenylstearylamine | 90 | 80 |
| 3 | Diphenylstearylamine | 90 | 80 |
| 4 | N-phenylstearyl trimethylene diamine | 98 | 98 |
| 5 | Phenylstearic acid salt of N-phenylstearyl trimethylene diamine (64/36 proportions) | 82 | 80 |
| 6 | Oleic acid salt of N-phenylstearyl trimethylene diamine (60/40 proportions) | 84 | 80 |
| 7 | Tall oil-fatty acid salt of N-phenylstearyl trimethylene diamine (61/39 proportions) | 84 | 80 |
| 8 | Dodecyl benzene sulfonic acid salt of N-phenylstearyl trimethylene diamine (50/50 proportions) | 85 | 80 |

EXAMPLE VI

A petroleum resin-solvent formulation, useful as a drilling fluid, completion fluid and the like, was evaluated by Test #1 and Test #2 as set forth hereinabove. The basic formulation was:

|  | Percent |
|---|---|
| Resin (Picco 100) | 50 |
| Toluene | 15 |
| Water | 35 |
| N,N,N,N',N'-pentamethyl - N,N' - trimethylene-N'-phenylstearyl diammonium dichloride (in the water phase) | 2 |

The petroleum resin used above was derived from the maltene fraction of asphalt, although any petroleum resin may be used. To the resin in the above formulation was added 2% oleic acid salt of N-phenylstearyl trimethylene diamine (64/36 proportions). The results were:

| Run No. | Adhesion agent added | Percent Test #1 | Test #2 |
|---|---|---|---|
| 1 | Control (basic formulation) | 40 | 20 |
| 2 | Phenylstearyl trimethylene diamine salt | 85 | 80 |

EXAMPLE VII

A petroleum wax (microcrystalline wax) dispersion, useful as a drilling fluid, completion fluid and the like was evaluated by Test #1 and Test #2. The basic formulation was:

|  | Percent |
|---|---|
| Microcrystalline wax 160° S.P. | 60 |
| Water | 40 |
| N,N,N,N',N'-pentamethyl - N,N' - trimethylene-N'-phenylstearyl diammonium dichloride (in the water phase) | 2 |

Results, using 1% of the phenylstearyl diamine salt described in Example VI above were:

| Run No. | Adhesion agent added | Percent Test #1 | Test #2 |
|---|---|---|---|
| 1 | Control (basic formulation) | 30 | 20 |
| 2 | Phenylstearyl diamine salt | 85 | 80 |

EXAMPLE VIII

A rubberized-asphalt dispersion, useful as a drilling fluid, completion fluid and the like, was evaluated by Test #1 and Test #2. The rubber ingredient utilized was a neoprene latex, but any natural rubber or synthetic rubber (such as GR-A acrylonitrile rubber, GR-I butyl rubber, GR-N nitrile rubber, GR-P polysulfide rubber, and GR-S styrene rubber including modified or extended rubbers as well as chloroprene rubbers) may be substituted therefore.

The basic formulation was:

|  | Percent |
|---|---|
| Asphalt (85–100 penetration) | 50 |
| Neoprene latex (Du Pont 950) | 15 |
| Water | 35 |
| N,N,N,N',N'-pentamethyl - N,N' - trimethylene-N'-phenylstearyl diammonium dichloride (in the water phase) | 2 |

To the above formula was added (into the asphalt) 1% of the phenylstearyl diamine salt of Example VI. Results of the evaluation were:

| Run No. | Adhesion agent added | Percent Test #1 | Test #2 |
|---|---|---|---|
| 1 | Control (basic formulation) | 40 | 20 |
| 2 | Phenylstearyl diamine salt | 95 | 90 |

While the invention has been described and exemplified in terms of its specific preferred embodiments, those skilled in the art will appreciate that modifications and variations can be made without departing from the spirit and scope of this invention.

What is claimed is:

1. In a bituminous dispersion of the type containing a solvent or aqueous phase and a bituminous phase, the bituminous phase being from 20–90% of the total weight of the dispersion, the improvement comprising the inclusion in the bituminous phase of from about 0.05–5.0 weight percent, of the total weight of said dispersion, of an adhesion agent selected from the group of aryl-substituted aliphatic nitrogen compounds consisting of:

(a) mono-aralkyl amines represented by the formula:

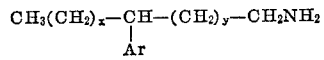

wherein $x$ and $y$ each is an integer from 0–19, the sum of $x$ and $y$ is an integer from 5–19 and Ar is selected from phenyl, tolyl and xylyl;

(b) di-aralkyl amines represented by the formula:

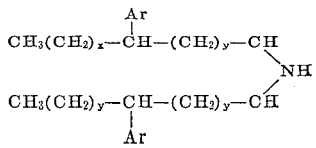

wherein $x$, $y$ and Ar are as defined above;

(c) aralkyl diamines represented by the formula:

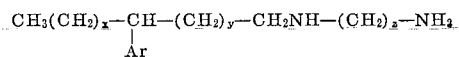

wherein $x$, $y$ and Ar are as defined as above and $z$ is an integer from 2–4; and (d) the oil-soluble, organic acid salts thereof selected from the group consisting of oleic acid, tallow acid, tall oil acid, soya acid, fish oil acid, naphthenic acid, phenylstearyl acid and dodecylbenzene sulfonic acid.

2. A dispersion according to claim 1, said dispersion having an aqueous phase, said aqueous phase including a water-soluble cationic emulsifier selected from the group consisting of water-soluble amines, diamines, quaternary ammonium compounds and diquaternary ammonium compounds.

3. The composition of claim 2 wherein said emulsifier is a phenylstearyl quaternary ammonium compound.

4. The composition of claim 2 in which said emulsifier is a phenylstearyl diammonium quaternary compound.

5. The composition of claim 2 in which said cationic emulsifier is present in amount from about 0.05 to about 2.0%.

6. The composition of claim 1 in which said adhesion agent is phenylstearyl amine.

7. The composition of claim 1 in which said adhesion agent is diphenylstearyl amine.

8. The composition of claim 1 in which said adhesion agent is phenylstearyl trimethylene diamine.

9. A cationic bituminous emulsion having an aqueous phase including from about 0.2 to about 5.0% by weight of a water-soluble cationic emulsifier; and a bituminous phase in an amount from 20–90% of the total weight of said dispersion, said bituminous phase containing from about 0.05–5.0 weight percent of an adhesion agent selected from the group consisting of phenylstearyl amine, diphenylstearyl amine, phenylstearyl trimethylene diamine, and their oil-soluble organic acid salts selected from the group consisting of oleic acid, tallow acid, tall oil acid, soya acid, fish oil acid, naphthenic acid, phenylstearyl acid and dodecylbenzene sulfonic acid.

References Cited

UNITED STATES PATENTS 3,236,671  2/1966  Dybalski et al. _____ 106—277

FOREIGN PATENTS 792,648  4/1958  Great Britain _____ 252—311.5

OTHER REFERENCES

"Armour Emulsifiers for Efficient W/O O/W Emulsions," Ad No. 6723, p. B&W, Oct. 10, 1967, by Armour Industrial Chemicals.

JULIUS FROME, Primary Examiner

J. B. EVANS, Assistant Examiner

U.S. Cl. X.R.

94—20; 106—277, 278; 252—311.5